Sept. 2, 1947. L. J. KOCI 2,426,620
TEMPERATURE RESPONSIVE CONTROL MECHANISM
Filed Aug. 23, 1943 5 Sheets-Sheet 2

Sept. 2, 1947.  L. J. KOCI  2,426,620
TEMPERATURE RESPONSIVE CONTROL MECHANISM
Filed Aug. 23, 1943  5 Sheets-Sheet 3

Inventor:
Ludvik J. Koci
By McCanna, Witcom & Morsbach
Attys.

Patented Sept. 2, 1947

2,426,620

UNITED STATES PATENT OFFICE 2,426,620

TEMPERATURE RESPONSIVE CONTROL MECHANISM

Ludvik J. Koci, Chicago, Ill., assignor to Sunbeam Corporation, Chicago, Ill., a corporation of Illinois Application August 23, 1943, Serial No. 499,632

25 Claims. (Cl. 200—122)

1

This invention relates to thermal timers adapted to be employed in devices having controllable means to be operated at intervals under control of thermostatic timing means, usually through the opening and closing of an electric circuit. The invention is adapted for general application as a thermal timer, but it is of particular utility in connection with electrically operated toasters, grills, waffle irons and other cooking appliances.

In this art a particularly difficult problem is presented because of many variable factors which to a greater or lesser degree affect the desired accuracy in timing successive operations such, for example, as successive toasting intervals under all conditions of operation. At best this timing has been a rough approximation. Aside from variables incident to mechanical structure such as the variable effect of friction upon the timing period, the variation in power required to operate the device, and the variation in initial temperatures of the device due to higher or lower ambient temperatures depending upon the length of the waiting period between the toasting intervals, a most difficult condition to deal with is variation in the voltage of the power supply to the device. Such voltage variation occurs from fluctuations in the current supply, also under conditions where several high wattage appliances are used simultaneously on the same circuit with the result that the voltage will vary depending on whether one or more of the appliances are in use.

An object of the present invention is, therefore, to provide a thermal timer which will function so as to provide results with substantial independence of the usual voltage variations and other variables such as mentioned above. According to my invention freedom from such variations is achieved by the provision of a novel thermostatic control characterized by a thermal element of large ratio of heat absorption capacity to heat dissipation factor as compared with that of the thermostatic element. This feature of my invention involves the use of a thermostatic device having a relatively large time constant, according to the principle of operation described more fully hereinafter.

Another object of my invention is to provide an improved thermal timer having the feature of obtaining proper compensation for variations in ambient temperature with due regard, in the case of a toaster, to the possible effect of changes in toaster temperature upon the toasting period. In other words, the intent is not merely to so compensate for variations of temperature sur-

2 rounding the timer so as to obtain essentially uniform timing periods irrespective of temperature variations, although the invention may be adapted to obtain such results. Instead, in the application of the invention to a toaster the compensating action of the timer herein disclosed is constructed so as to properly compensate for variations of toaster temperature with the intent of obtaining toast of uniform color rather than of obtaining uniform timing periods.

Another object of my invention is to provide a thermal timer characterized by a main thermal timer element which has no thermostatic action in itself but which coacts with a comparatively thin strip of thermostatic metal which has an action portion mainly responsive to the temperature of said main thermal timer element. Thus, the thermostatic element not only responds to the temperature of the device, including ambient temperature, but it is primarily responsive to the temperature of the main thermal timer element. According to my invention this main thermal timer element is of comparatively large ratio of mass to surface area and this characteristic (in the association herein disclosed) gives a relatively large time constant which is an important factor in meeting the voltage variation problem.

Another object is to provide an improved thermal timer of the character described in which the main thermal timer element has heating and cooling functions and in which the cooling function is effected as a result of contact of the thermal timer element against a suitable cooling surface associated with cooling means of large heat absorption capacity and high thermal conductivity.

Another object provides an improved thermal timer having one or more of the described novel features in coaction with a structure characterized by snap action and substantial elimination of friction, thus further promoting precision control in the operation of thermal timers.

Another object of the invention is to provide an improved thermostatic switch.

Another object of the invention is to provide a thermostatic timer having one or more novel features of the character described coacting in a toaster to produce improved toasting operation.

Other objects and attendant advantages will be appreciated by those skilled in this art as the invention becomes better understood by reference to the following description when considered in connection with the the accompanying drawings, in which:

The thermal timer feature of my invention is best illustrated in Figs. 1 to 8, inclusive. In this embodiment the device is designed to close and open an electric circuit by means of make-and-break contacts 21 and 22. In the broader phase of my invention the contacts may be arranged in any circuit employed for any suitable or desired control or indicating function; and in the present instance the circuit includes the heating elements of an electric toaster as will be described more fully hereinafter. Conductors 23 and 24 lead from the contacts 21 and 22 for connection with the heater circuit. The contacts are adapted to be closed to the "on" position in response to a manual operation or other operation for the purpose of starting or initiating the timing cycle. In this case opening of the contacts is effected in response to heating of one end portion of a thermostatic element 25 to a predetermined degree and then automatically latching the thermostatic element and the contacts in an "off" condition as will be described more fully hereinafter. The thermostat in turn responds to heat from a primary source by conduction through a thermal element designated generally by 26 and to a secondary and uncontrollable source of heat such as the ambient temperature. The thermostatic action in response to these primary and secondary heating mediums is in keeping with the novel principle disclosed and claimed in Patent No. 2,332,518, granted October 26, 1943, for "Thermostat." In the present invention the thermostat is preferably in the form of a strip of thermostatic material such as a bimetallic strip of uniform width and thickness so as to have substantially uniform section modulus throughout its length. One end portion 27 of the thermostatic strip is fixedly secured by means of rivets 28 to a stationary supporting member 29 which in turn is supported upon and between the side members 31 and 32 of a suitable frame structure. The opposite end portion 33 of the thermostatic strip is constrained by suitable means against angular motion but offering minimum restraint to motion in a direction normal to the length of the strip for the purpose of applying a reactive couple to the strip and causing primary and secondary thermostatic actions in the strip in response to said primary and secondary temperature mediums. In this embodiment the end portion 33 is fixedly clamped between the end portion 34 of the thermal element 26 and the upper end 35 of a vertical motion translating member 36. This member 36 carries a cone point 37 seating in a complemental recess 38 in the end of a lever member 39 which in turn has a bevel-edge support at 41 on the frame. To insure greater accuracy and reduction in friction to a minimum stationary pivot points 41 are of hardened steel formed from a suitable insert 42 suitably fixed to the frame walls 31—32. It will be observed that the parts 25, 36, and 39 together with the supporting frame provide a parallelogram structure wherein the end portion of the thermostatic strip remote from its fixedly mounted end is constrained to move in a vertical plane without appreciably changing the end portion 33 from a condition of parallelism at all positions. By this means the outer end portion of the bimetallic strip is substantially free to move in a plane normal to the length of the strip but is restrained against angular motion with respect to the length of the strip. The thermostatic strip is thus supported in such manner as to be responsive to temperature gradient lengthwise of the strip, thus obtaining both a primary thermostatic action and a secondary or compensating action in the single strip.

Figure 1:
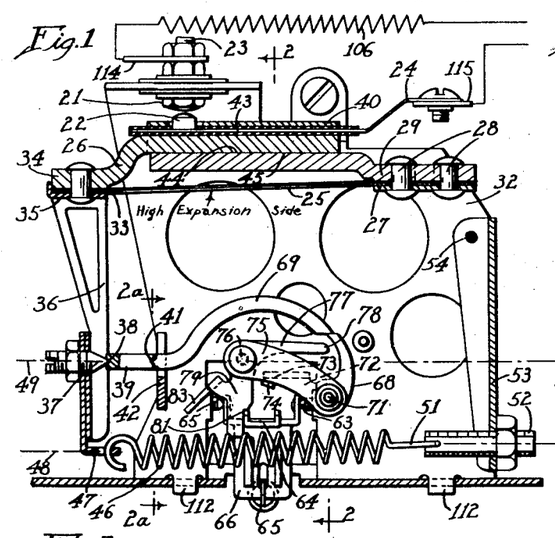
Figure 1 is a vertical section through a thermostatic timing device embodying my invention, showing the parts latched in the "off" position, that is, with the switch or circuit open.
Figure 9:
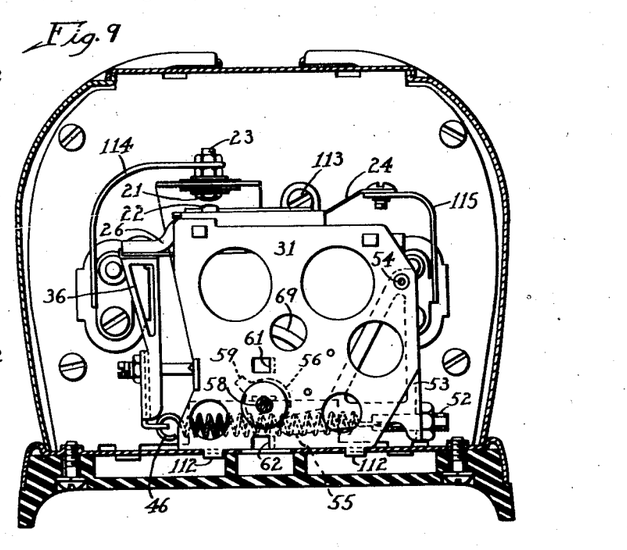
Figs. 9 and 10 are cross sections through the toaster taken substantially on the section lines 9—9 and 10—10 of Fig. 8.
Figure 10:
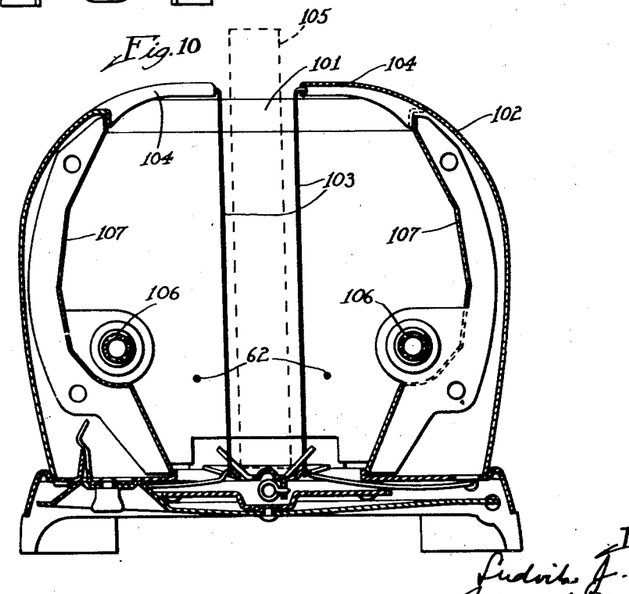
Figure 11:
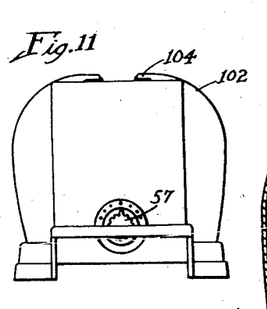
Figs. 11 and 12 are end elevations, on a reduced scale, looking at opposite ends of the toaster.

It will now be observed that I have provided a thermal element 26 in the form of a relatively massive bar of copper or other material of high heat capacity and that means is provided for heating this bar at a substantially constant rate. As will be presently seen, this thermal element 26 is used as the medium through which heat is conducted to one end of the thermostatic strip to produce the described temperature gradient lengthwise of the strip. In the present example the thermal element is heated by an electrical resistor 43 which also constitutes the conductor leading to the contact 22, this resistor or electric heating element being suitably electrically insulated on the element 26. It will also be observed that the thermal element 26 possesses a large ratio of mass to surface area and, therefore, has the characteristic of large ratio of heat absorption capacity to heat dissipation factor. Also, this thermal element is shaped to provide an elongated flat face 44 substantially parallel with the parallelogram movement above described, which face is adapted by vertical movement to be brought into and out of contact with a corresponding flat face 45 on top of the member 29. The member 29 is a cooling body and is adapted to absorb heat from the thermal element 26 when these parts are brought into contact for the purpose of quickly cooling the thermal element and thereby draining heat from the outer end of the thermostatic strip when the thermostat moves from the contact closing to the contact opening position. It will now be observed that the thermostatic strip is arranged with the high expansion side down, as indicated in Figure 1, so that the temperature gradient lengthwise of the strip upon heating the outer end portion to a higher degree than the inner end portion will respond in a thermostatic action tending to move its outer end (that is, the left hand portion adjacent to the thermal member 26) downwardly in a direction to open the contacts; and upon cooling this outer end portion the thermostat will respond in the opposite direction, tending to close the contacts. In the present embodiment I have provided means tending to bias the thermostatic strip upwardly or towards the closed contact position when the entire device is at normal room temperature. In order to insure quick and positive opening and closing of the contacts I have provided means for obtaining snap action in each direction. This is obtained by use of a contractile spring 46 applied to the lower end of member 36 to exert a pull in a line of action substantially parallel with the surfaces 44 and 45, and preferably slightly inclined upwardly to the right as indicated by the plane 48 compared with the plane 49 which is parallel to the surfaces 44 and 45. Such inclination permits spring 46 to provide a secondary action tending to bias the thermostatic strip upward in addition to its primary function of providing snap action. Actually in the present construction the thermostatic strip 25 is preformed before assembly but to a constant radius of curvature and thus I obtain none of the biasing effect above mentioned by the thermostatic strip itself. This initial preforming is solely for the purpose of setting up initial stress in the strip opposite in direction to that to which it is subjected under heating and thus results in dependable functioning of the strip when subjected to higher temperatures. However, because the strip is preformed to constant radius of curvature and because it is supported so that its two end portions are restrained against angular motion, there will result no net bias of the strip in a line of action normal to its length when the device is finally assembled and maintained at room temperature. This function will be understood from the disclosure in my application for "Thermostat" above mentioned. In actual practice I have found it best to provide for an overabundance of biasing effect by upward inclination of the spring 46 as above described and reducing this to the desired amount by final adjustment of a tensile spring 46'' as shown only in Figure 5. The tension of the spring 46 can be varied by two adjustments, i. e., a factory adjustment 52 and a manual adjustment performed by turning the knob 57 which moves the cam 56. An increase in the tension of the spring increases the temperature interval between "snap down" and "snap up" operation of the device and this enables an adjustment of the timing period. It will be apparent that, depending on the inclination of the spring 46 relative to the member 39, such increase in tension of the spring 46 may affect the "snap down" temperature to a greater degree than the "snap up" temperature, or vice versa. The factory adjustment 52 is to provide means for adjustment of variation existing between the various springs so that the device may be set so as to provide the desired range of adjustment by final manipulation of the control knob, i. e., for a toaster the adjustment 52 would be made so that the operator obtains toast a medium color when the knob is set to medium. In order to vary the tension of the spring 46 for the purpose of varying the time interval controlled by the device as will be presently apparent, I have attached the opposite end 51 to an adjustable member 52 carried on the lower end of a lever 53 which is pivoted on the frame at 54 and has a lever arm 55 extending in the direction of the spring and bearing against an adjustable cam 56. In this embodiment the cam has a uniform rise for about 210° of its circumference and it is shown in Fig. 9 in an intermediate position of adjustment. In the application to a toaster the cam 56 is adjustable by means of a knob 57 at the outer side of the device, the knob being fixed to a shaft 58 which is supported on the frame wall 31 and to which shaft the cam 56 is fixed. The cam surface is designed so that by turning the knob clockwise, viewing Fig. 9, the tension of the spring 46 will be increased to lengthen the timing period and by turning the knob in the opposite direction this period will be shortened. A stop projection 59 on the cam 56 is adapted to operate between stops 61 and 62.

Figure 2:
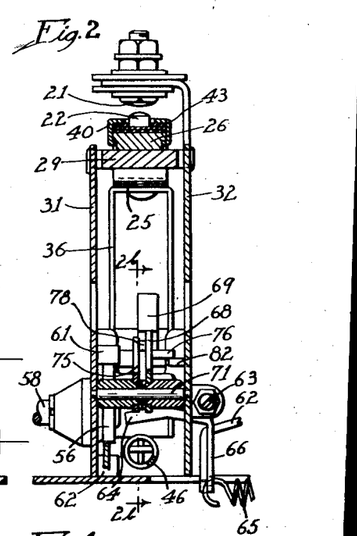
Fig. 2 is a cross section taken substantially on the section line 2—2 of Figure 1.
Figures 2A, 2B, 3, 4:
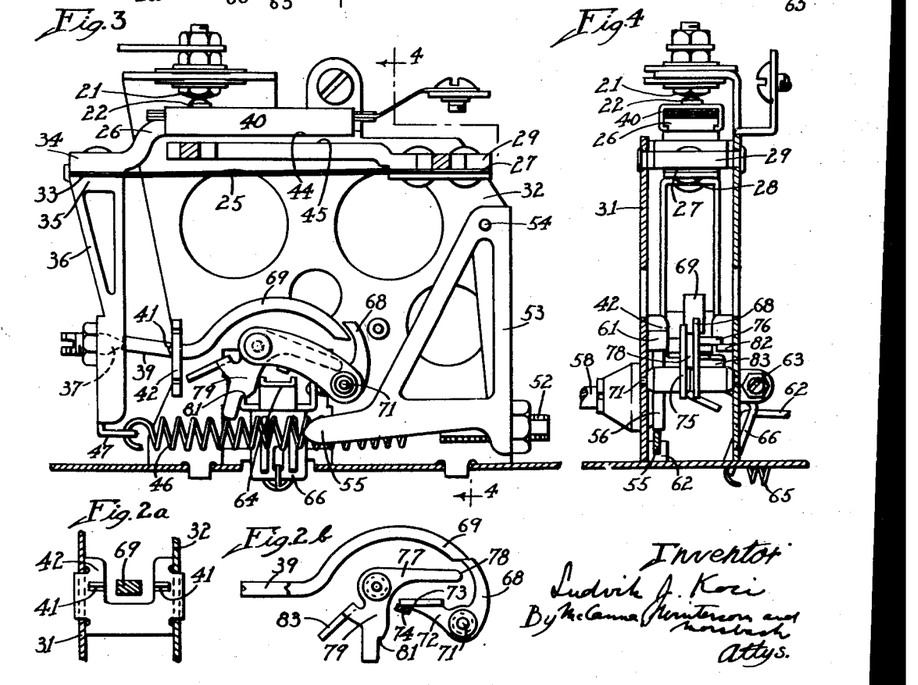
Figs. 2a and 2b are detail sections taken substantially on the section lines 2a—2a and 2b—2b of Figs. 1 and 2, respectively.
Fig. 3 is a section somewhat similar to Figure 1 but showing some of the parts in elevation and moved to the "on" circuit closing position.
Fig. 4 is a cross section through Fig. 3 taken substantially on the section line 4—4 of Fig. 3.

It will now be observed that in view of the construction described and the upward bias imposed on the thermostatic strip, unless otherwise restrained the parts would move in a quick snap-acting movement from the "off" position shown in Figure 1 to the "on" position shown in Fig. 3 when the device is at room temperature. It will also be observed that upon heating the outer end portion of the thermostatic strip it will tend to deflect downwardly against the bias furnished by the spring 46 due to its inclination and when heated to a sufficient degree the energy deriving from this thermostatic action will overcome the spring bias and cause the outer end of the strip to move in a quick snap-acting movement downwardly to the "off" position. Thus I have provided a snap-acting switch structure which is substantially free from friction by reason of the avoidance of friction bearings and sliding engagements other than the fine edge or point bearings 38 and 41. This construction is distinctly advantageous in that by reducing friction to a minimum the serious condition of variable friction incident to surfaces rubbing under higher temperatures is avoided and the desired functions are performed to a high degree of uniformity and precision.

It will also be observed from the foregoing that the end portion 33 of the bimetallic strip is maintained at all times in a plane normal to the length of the strip, in other words, parallel with the stationary end portion 27, so that as the end portion 33 moves vertically it is subject to a reactive couple, thereby imposing forces in the thermostatic strip by reason of which the primary and compensating thermostatic actions are obtained as described more fully in my above mentioned application for thermostat.

Figure 5:
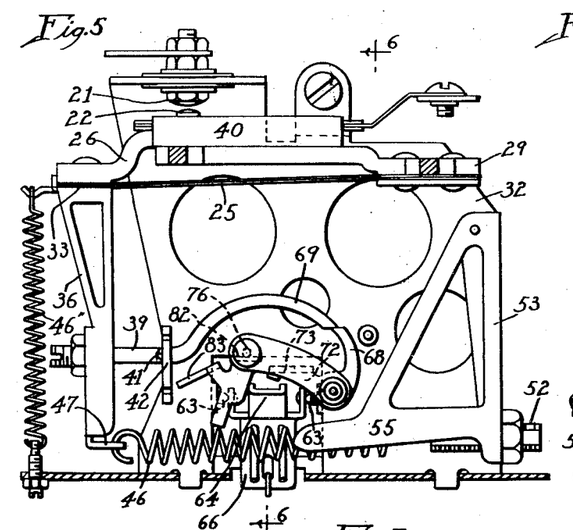
Fig. 5 is a section somewhat similar to Figure 1 showing the parts latched in the "off" position but with some of the actuating parts moved as for the purpose of starting a succeeding operation.
Figure 6:
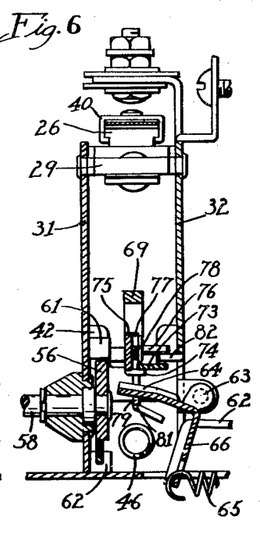
Fig. 6 is a cross section taken irregularly through the device as indicated by the section line 6—6 of Fig. 5.

My invention also provides control mechanism coacting with the described thermal timer and switch structure to effect certain controlled operations, as will now be described, referring particularly to Figs. 1 to 9, inclusive. In the application of this structure to an appliance such as an electric toaster the control is mainly through movement of an actuating member, or is a consequence of the movement or position of such actuating member. This member may itself be actuated manually, or by a control means, or by the act of inserting and removing a bread slice with respect to the toasting compartment as is done in the toaster shown in the present embodiment. This actuating member, designated generally by 62 is pivoted at 63 to the frame wall 32 (as best shown in Figure 6) and has an actuating arm 64 adapted to be moved or positioned in coacting relation with a latching mechanism according to the position of the member 62. A contractile spring 65 is applied at one end to an arm 66 of said member 62 and is adjustably connected at its opposite end to a stationary part of the device as, for example, in any of the spaced notches 67, Fig. 8, for the purpose of varying the tension which is constantly applied against the member 62 and tends to move it to the raised position shown in Fig. 8. In this case the member 62 is normally disposed in the toasting compartment and arranged so as to be engaged by a bread slice when the latter is inserted or positioned for the purpose of being toasted. The member 62 is actuated by the weight of the bread slice from the full line position to the dotted line position shown in Fig. 8. This movement causes the end 64 of the member 62 to release a latch device which holds the thermostatic switch in the "off" position when the device is normally at rest. This latching of the switch (shown in the Figure 1 position) is effected by a latch pawl designated generally by 68 which latches a latch member 69 which in turn is fixed or integral with the lever member 39. The pawl 68 is freely pivotal on a fixed supporting pin 71 which in turn is supported between the frame walls 31—32. This pawl is in effect a bell-crank lever having an arm 72 which carries a laterally projecting abutment face 73. This abutment face 73 is adapted to be engaged by a complemental abutment face 74 which is integral with a link 75. Also, as in the case of the pawl 68, this link 75 is supported for free rotative movement on the shaft 71. The link 75 carries on its outer end a laterally projecting pin 76 on which is pivotally supported a pawl releasing member designated generally by 77. This member 77 is also in the form of a bell-crank lever having an arm 78 arranged to be moved by the end of member 69 when 69 is unlatched, causing disengagement of latch 79—81 from 64. A depending arm 79 of the member 77 is shaped to provide an abutment face 81 arranged to be engaged by the arm 64 of the actuating member when the arm 64 is moved upwardly from the position shown in Figs. 1 and 8. The latch release member 77 has, in effect, a floating support through the medium of the link 75, and it is supported in the position shown in Figure 1 by means of the pin 76 which projects laterally and rests on a stop lug 82 fixed to the frame wall 32, thus permitting the member 77 to rise and fall in an arc about the center 71 in the course of its operation. A projection 83 on the lower arm of the member 77 serves merely to limit rotative displacement of the member 77 in a clockwise direction by engagement with the adjacent part 69 and also serves to provide added weight to the depending arm 79 so that it will gravitate to the position shown in Figure 1. Viewing Fig. 2 it will be observed that the end portion of the latch member 69 is of sufficient width to overlie the pawl 68 and also the end 78 of the pawl release member, so as to coact with the parts 68 and 78 at certain times.

Operation of the control and latch mechanism in conjunction with the thermal timer is as follows: Starting with the normal at rest position shown in Figure 1, the contacts are open and the thermostatic strip and connected parts are held latched in this position by coaction of the latching parts 68—69, it being apparent that the upward bias against the thermostatic strip imposed by the spring 46 exerts a pull against the latch member 69 tending to move it in a clockwise direction and which movement is stopped by the pawl 68. Movement of this pawl 68 in the opposite direction is stopped by contact of the abutment face 73 against the abutment face 74 and thus back to the pin 76 which bears down against the stop 82. The timing cycle is started in this case by manual operation by the act of inserting a bread slice into the toaster, the bread slice engaging the actuating member 62 and moving it downwardly, thereby lifting its arm 64 against the abutment face 81. This upward pressure against the abutment face 81 moves the latch release member 79 in a clockwise direction about the center 71 with the result that the link 75 is moved in a clockwise direction about the pin 71, thereby moving the latch member 68 in the same direction by means of abutments 74—73, and releasing the latch member 69. Instantly with the unlatching of member 69 it moves in a clockwise direction and its outer end strikes the end portion 78 of the member 77 causing the latter to move clockwise about the pin 76 and thereby causing disengagement of 81 from 64. This disengagement permits link 75 and consequently the pawl 68 to move in a counterclockwise direction under the action of gravity into a position where the upper end of pawl 68 is again in position to relatch member 69 at any subsequent upper movement thereof, this position of pawl 68 being shown in Figure 3. Simultaneously with this movement the thermostatic strip and connected parts move in a snap action to the "on" position shown in Figure 3. Current now flows through the circuit, energizing the toasting elements and the resistor or heater 43. The thermal element 26 will now be heated by the resistor 42 and in turn will heat the outer end portion of the thermostatic strip directly by conduction. This portion of the thermostatic strip will respond to the heat transfer, as above described, and when heated to a temperature determined by tension in spring 46 (which has been adjusted by setting of the manual control knob) and also the temperature of the other end portion of the thermostatic strip, it will snap down to the "off" position in which it will be latched by reason of the tendency of the pawl 68 to move counterclockwise under the weight of its arm 72 and engage beneath the latch member 69, as shown in Fig. 5. This downward snap action terminates the timing interval by opening the contacts and consequently the heater circuit. Said snap action movement may also be utilized for actuating a control function such as actuating a toast ejecting device. In the present toaster embodiment the toasted slice remains in the toasting compartment until removed by hand; consequently the arm 64 of the actuating member remains in the upper position shown in Figs. 5 and 6. When the bread slice is picked up by hand the member 64 will be returned by the spring 65 to its original position and its arm 64 will be lowered, thereby permitting the pawl release member 77 to return to the original position, Figure 1. When the snap down action occurs the surface 44 of the thermal element 26 will be moved into contact with the cooling surface 45, thereby cooling the thermal element at a comparatively quick rate. For example, in a structure designed for toasting periods in a range from 1½ minutes to 3½ minutes, the cooling period for a 2½ minute toasting time would be approximately 10 seconds. This quick cooling of the thermal element 26 also cools the outer end portion of the thermostatic strip and causes a simultaneous temperature rise of the right hand portion of the strip, thereby reducing the temperature difference between the two end portions and resulting in a thermostatic action the resultant force of which tends to move the outer end of the strip upwardly. Thus, the thermostatic action responds to cooling of the outer end portion of the strip and this function, together with the bias of the spring 46, tends to move the parts to the circuit closing position. This movement, however, is prevented by the latching of parts 68—69, as described. This completes a normal cycle of operation.

In the event the toasted bread slice is removed before the end of the cooling period the parts will remain latched in the "off" position, and the actuating arm 64 will return to the lower, at rest position. If a new bread silce is now inserted before the end of the cooling period the arm 64 again will be actuated to unlatch the parts 68—69, but the left end of the thermostatic strip will remain in its lower position with the circuit open until it has cooled sufficiently to be overcome by the spring bias and snapped upwardly to start a new timing operation. Another abnormal operation may occur in the event the bread slice being toasted is removed before the end of the timing period. Should this occur, the end 64 of the actuating member will at the end of its downward movement bear against the spring 46 with sufficient pressure to produce a snap action downwardly, thus opening the circuit.

The thermostatic timing means is so designed that its operation may be initiated by a relatively small force as by the weight of a slice of bread, and the actuating operation may be performed at a slow or a fast rate as by slow or fast bread change. The construction is further designed so that it permits of removing a toasted bread slice after termination of the toasting period and insertion of a new bread slice before the end of the cooling time, without disturbing the timing of the succeeding toasting period. Also, the bread slice may be removed at any time, at will, by the operator without disturbing the timing of the next succeeding toasting period.

Figure 7:
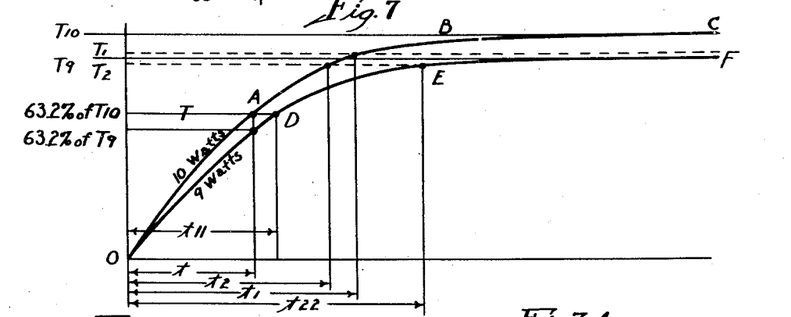
Figs. 7, 7a, and 7b, are diagrammatic curves used in describing the invention.
Figure 12:
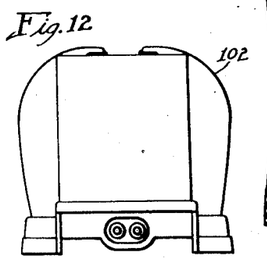
Figure 13:
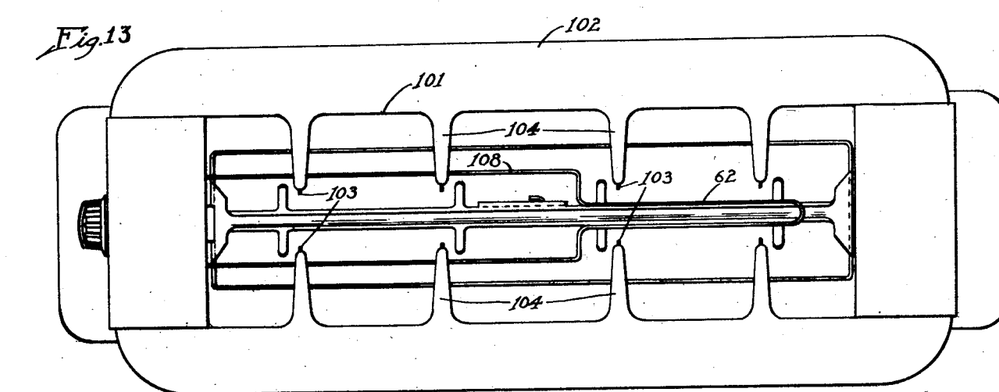
Figs. 13 and 14 are top and bottom views, respectively, of the toaster, on a scale reduced from that shown in Figs. 8, 9, and 10.
Figure 14:
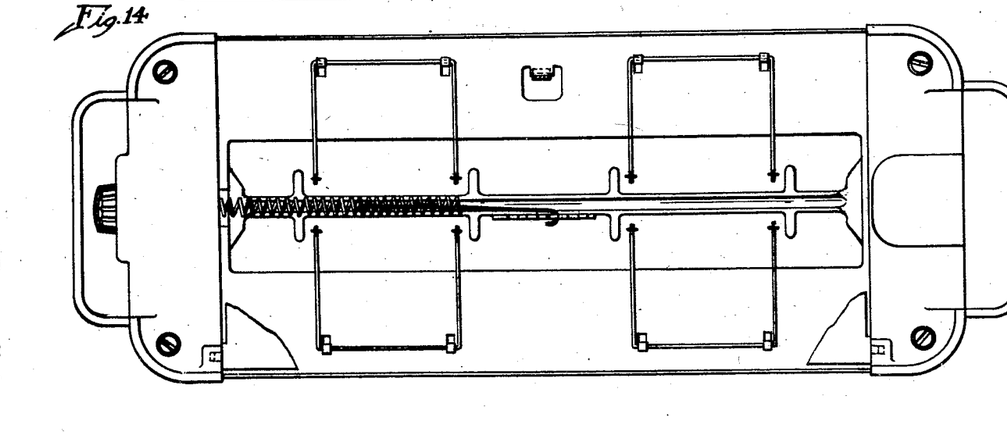

The functional relationship of the thermostatic timing means to a toaster or other appliance or device to be controlled wherein the problem of obtaining uniform timing regardless of voltage variations and uncontrollable variations in temperature such as ambient temperature incidental to housing structure and other conditions, will now be described. The timing device is here shown incorporated in a toaster of the character disclosed in the application of Ivar Jepson, Serial No. 389,916, filed April 23, 1941, for Toaster, but it should be expressly understood that this showing is only for purpose of illustrating the functions of the timing device. In a toaster of this type provision is made for receiving one or more bread slices through a relatively wide opening 101 in the top of a casing structure 102 and supporting the bread slices in a central upright position in the toasting compartment by means of guide wires 103 supported at the top by narrow fingers 104 which project from the casing proper inwardly into the top opening. The bread slice is supported in a toasting position shown in dotted lines by 105 in Fig. 9, with the upper portion of the slice projecting above the casing proper so as to facilitate removal of the toasted slice by hand; thus, avoiding the need for toast ejecting mechanism. The toasting may be effected by suitable heating elements. In this toaster a coiled heating element 106 is employed at each side of the bread slice in coaction with a heat reflector surface 107 so designed in conjunction with the heating element as to transmit heat rays by reflection and directly from the heating element to toast the bread slice substantially uniformly over its entire side. Where two slices of bread are to be toasted simultaneously the toaster is made of sufficient length to provide for two toasting compartments arranged end to end as shown in Fig. 12. In such case I have designed the member 62 to provide a laterally offset portion 108 (Fig. 13) which provides clearance around the bread slice located in the toasting compartment adjacent to the timing mechanism and so that only the bread slice in the remote toasting compartment seats on the member 62 and actuates this member when the slice is inserted and removed. This gives greater leverage and a more dependable operation where two slices are to be toasted in the arrangement shown. In this case the toasting compartment has a transverse wall structure 109 at each end and an end casing 111 spaced outwardly from the end wall structure, thereby providing a narrow compartment for the enclosure of element mountings, electrical connections, and operating mechanism such as the thermostatic timing control mechanism of this invention. As shown in Fig. 7 the timing device is supported within the enclosure at one end of the toaster and is thus removed from the direct rays of the heating elements. The timing device is suitably fastened in position as by means of locating lugs 112 engaging in corresponding openings in the bottom of the wall of the toaster casing and one or more screw fastenings 113 (Figs. 7 and 8) to the transverse wall 109. Bus bars 114 and 115 connect the terminals 23 and 24, respectively, of the timing device in series with the heating elements. Electric current is supplied to the heating elements through the usual terminal posts 116 which are adapted for connection to the usual current supply plug.

Figure 7A:
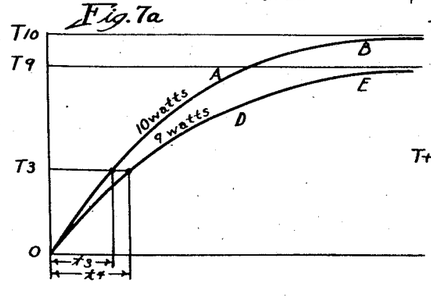
Figure 7B:
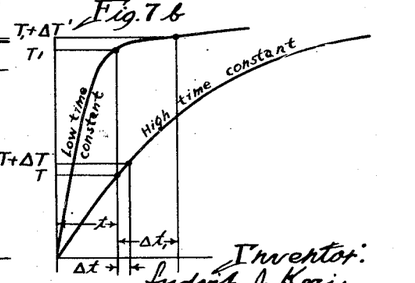
Figure 8:
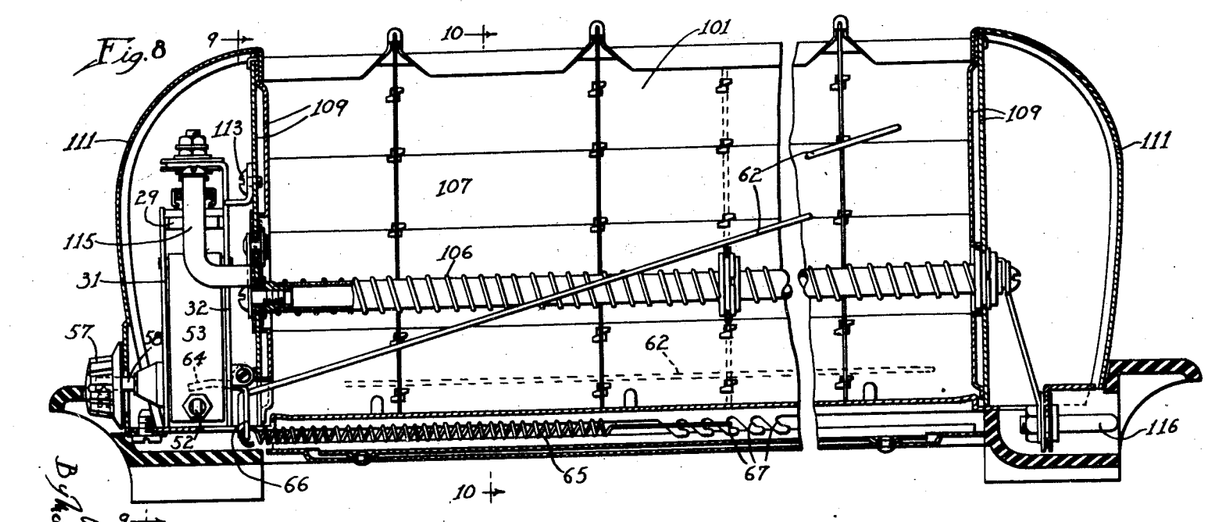
Fig. 8 is a vertical longitudinal section through a heating device or appliance such as an electric toaster in which the thermostatic timer is incorporated, showing the timer in elevation.

Referring now to Figs. 7, 7a, and 7b, I have shown diagrammatically by curves, illustrations of what is meant by a thermal timer of "large time constant" as this term is used in the present application. This is in furtherance of the new principle disclosed herein of providing a thermal timer of relatively large time constant and terminating the heating of the main thermal element at a temperature substantially below that which it would reach if permitted to rise to an equilibrium temperature, whereby I am able to obtain considerable improvement with respect to voltage variations. With this new principle I am also able to materially reduce and substantially eliminate undesirable effects from frictional resistance. In the present embodiment I employ a main thermal element in the form of a block of metal 26 which is especially designed to have a large ratio of mass to exposed surface area. A copper block is used because of its unusually high specific heat. I prefer to apply to the exposed external surface of the block a bright plating or coating of low radiant heat emission to further reduce the heat dissipation factor. This main thermal element is, therefore, designed to have a large ratio of heat absorption factor with respect to its heat dissipation factor, thereby obtaining a substantially large time constant. In this embodiment the block is of electrolytically refined copper. This does not substantially change the time constant but is used solely for the purpose of obtaining maximum thermal conductivity with the ultimate purpose of obtaining rapid cooling of this relatively massive block when it is moved into contact with the cooling member, as above described. I prefer to employ a relatively thin thermostatic material, such as a bimetallic strip, and to coordinate this strip with the main thermal element or block in such manner that the energy of the thin strip in response to temperature change is utilized as the final energy for producing the actuating motion. This thin thermostatic strip serves to provide proper flexibility to perform the desired actuating function. With reference to Fig. 7, it is known that if a piece of metal is heated at a constant rate of say 10 watts of heat input, it will rise in temperature along a curve approximately at OABC and at point B it will closely approach an equilibrium temperature condition which from theoretical considerations should never reach point C (temperature designated by $T_{10}$) except at infinite time, but leaving such a small difference in the approach to equilibrum as to be practically undiscernible. If the same piece is heated from the same initial temperature but under an input of only 9 watts, its temperature will rise along a similar curve ODEF but approach a lower equilibrium temperature designated by $T_9$. Thus, in the first case (10 watts) it will reach 63.2% of its total rise in a time shown by $t$; and similarly in the second case (9 watts) it will reach 63.2% of its total rise in the same time $t$. This time at which the material reaches 63.2% of its equilibrium temperature rise is commonly known as the time constant. This is a characteristic of the block of material alone and is dependent on the ratio of the heat absorption factor with respect to its heat dissipation factor and as seen from the foregoing discussion it is theoretically independent of the constant rate at which the material is heated. Thus, a relatively massive piece of material of high specific heat and small surface area would have a large time constant (time constant being customarily given in units of time); and conversely, a relatively thin piece of material of low specific heat and of large surface area would possess a characteristic low time constant. Now consider what happens if some function is to be performed by this heat block 26 when it reaches a given predetermined temperature under the two conditions of heat input discussed above. Assuming, for example, that an electric circuit is to be interrupted as in the present invention when the block reaches temperature $T_1$, intermediate between temperatures $T_9$ and $T_{10}$. It is apparent that this temperature will be reached at a time $t_1$ under an input of 10 watts and will never be reached under an input of 9 watts. Assume now that the device is adjusted to perform the same function when a temperature $T_2$ is chosen slightly lower than $T_9$. Under an input of 10 watts this temperature will be reached in a time $t_2$; and under an input of 9 watts it will be reached in a time $t_{22}$. It will be noted in the second case that although the function will be performed under both the 10 watts and the 9 watts input, the time $t_{22}$ is considerably greater than the time $t_2$. The change in input from 10 to 9 watts represents a decrease in the rate of heat input of only 10% but it will be apparent that the resultant time period $t_{22}$ will be increased by an amount substantially greater than 10% of $t_2$. Now assume that an adjustment is made in the device to have this function performed when a temperature $T_3$ substantially below equilibrium temperature $T_9$ is reached as shown in Fig. 7a. In this case it is obvious that $t_3$ and $t_4$ are in a ratio more closely proportionate to the ratio of the two heat inputs of 10 and 9 watts than in the previous case. As a matter of fact if the two curves of temperature rise OAB and ODE were perfectly straight lines from the point of origin O to the $T_3$ temperature line, the ratio of $t_3$ to $t_4$ would be in exactly the same proportion as the ratio 10 to 9. Such a case of temperature rise is theoretical but might be closely approached in a case in which the material is highly polished and heated in a vacuum.

I have found that it is not desirable to use a proportionate increase in time period with a given decrease of input wattage when a timer is applied to toasting. I have found that in order to obtain toasting of the same color it is necessary to increase the toasting period by a slightly larger percentage than the percentage drop in wattage. For example, if a period of 1½ minutes is required to toast a slice of bread to a given brownness under an input of 1000 watts, it is necessary to heat the same piece of bread for a period which is more than 10% longer in case the wattage is reduced by 10%. This refers to the characteristic of the toaster itself. I have, therefore, found that in order to obtain uniform toasting under varying conditions of voltage, operation of the thermal member to a temperature close to equilibrium temperature is not desirable, nor is it desirable to operate at a temperature too close to the origin. Also, if a condition of straight line temperature rise such as mentioned above could be had, it would not provide a favorable condition. Such essentially straight line temperature rise may be desirable in some other application of a thermal timer such as may occur in industrial heating where it is usually desired to obtain a timing period exactly inversely proportional to the second power of the voltage so as to obtain equal energy periods, but my observation has been that such operation would not be desirable in its application to a toaster. According to my invention, the thermal timer when applied to a toaster such as herein described, is adjusted to function when it reaches a temperature about ⅓ below equilibrium expressed in terms of difference between equilibrium temperature and initial or ambient temperature. For example, referring again to Fig. 7, we have the characteristic feature of operating at a temperature T designated as 63.2% of $T_{10}$ which is located approximately ⅔ of the distance up from ambient temperature and expressed in terms of the difference between equilibrium temperature and ambient temperature. We also have the further characteristic or requirement that such operation shall occur when the toasted slice reaches a desirable brownness, which is of about a minute and a half in a 1000 watt double slice toaster when started from cool. Thus we have the necessity of providing a timing period which may be a minute and a half or somewhat longer in length combined with the desirability of having this time coincide with a temperature rise of our thermal member which is approximately ⅔ of the range between the initial temperature and equilibrium temperature and we want to accomplish this in a single cycle of operation of the thermostatic strip per toasting period. According to my invention these factors can all be reconciled by the use of a thermal member of adequate time constant.

According to my invention the main thermal element is designed to rise in temperature along a curve OABC when operated at normal rated voltage so as to function at an actuating temperature T which is approximately ⅓ below the final equilibrium temperature $T_{10}$. If the device is operated under a 5% reduction in voltage (which will result in approximately a 10% drop in wattage) the main thermal element will rise in temperature along the curve ODEF. If this voltage change occurs without a corresponding change of manual adjustment the timer will still operate to terminate the toasting period when the main thermal element reaches the same temperature T. It is seen from Figure 7 that this will now occur in a time period $t_{11}$ which is slightly more than 10% greater than the previous time period $t$. It will accordingly result in toast of substantially the same color.

Thus far we have demonstrated the advantage of operation with a device of substantially large time constant. However, as explained above, in order to obtain necessary flexibility and sufficiently large range of movement, I have incorporated in this device a relatively long and thin bimetallic strip which constitutes the actual thermo-active member. The combination of this member with the main thermal element is an essential characteristic of the invention. By using such a bimetallic strip in accordance with the teachings of my above-mentioned application for "Thermostat," wherein the two end portions of the strip possess the highest thermostatic activity and by clamping one of these end portions in good thermal contact with a block of material of large time constant, the temperature rise of this active portion of the thermostatic strip is essentially identical with that of the block especially if the latter is made of high thermal conductivity material such as copper. It will thus be apparent that in this invention I use a reasonably flexible thermostatic strip for an actuating member and still obtain a large time constant in the main thermal element, thus permitting the cycle timing to be satisfactorily applied to a toaster in order to obtain substantially uniform toasting regardless of ordinary variations in voltage.

Reference to Fig. 7b is here made to illustrate the relative effect of friction in two instances of thermal timing, in the first case using a thermostat device of high time constant and in the second case a thermostat device of low time constant. Assume it is desired to obtain a timing period equal to $t$. Accordingly, the thermostat device of large time constant would be adjusted to operate when it reaches a temperature T. Assume now there occurs in the system some frictional resistance which is usually a variable and highly uncontrollable quantity. In this instance, however, we will assume it to be of such value that it requires an increase in temperature of the thermostat by an amount $\Delta T$ to fully overcome its effect, such temperature line being designated by $T+\Delta T$ (the delta sign $\Delta$ being used to designate an incremental quantity). It will be apparent that the resultant period will be increased by a time increment equal to $\Delta t$ which, unless the frictional resistance is very large, will involve a total timing period only slightly greater than that which would occur in the absence of friction. If now, on the other hand, a thermostat device of relatively low time constant were used for the purpose of obtaining the same timing period (equal to $t$), it would have to be adjusted to operate at a temperature point very close to its equilibrium temperature and indicated by the symbol $T_1$. If there now were imposed the same amount of frictional resistance as before, and if the thermostatic strip had the same thermostatic constant as before, it would be necessary for the thermostat to be heated by an additional increase in temperature designated $\Delta T$, which increment is equal in value to the increment $\Delta T$ previously discussed. However, in this instance, it is apparent that the timing period will be increased by an amount $\Delta t_1$ and the resultant total timing period $t+\Delta t_1$ will be considerably increased over that which would have occurred in the absence of friction. In the foregoing example it should be borne in mind that the quantities are exaggerated for the purpose of simple illustration. In the present embodiment of my invention insofar as it embodies the principle just discussed, it is not necessary to operate as far below equilibrium temperature as represented by T in the first case. In the present embodiment I have found that operation of the thermostat so adjusted as to function when it reaches a temperature approximately ⅓ below equilibrium which was originally determined from a consideration of the factors involving the effect of voltage, is in itself a factor of improvement with respect to friction over the condition obtained when using a simple thermostatic strip for both the thermal member and the thermoactive material.

The advantages of the invention will be apparent to those skilled in the art from the foregoing. While I have thus described and illustrated a specific embodiment of the invention, numerous alterations may be made therein embodying the teachings of this invention, and I do not wish to be limited except as required by the prior art and the scope of the appended claims, in which I claim:

1. A thermostatic switch having, in combination, a bimetallic strip having a portion fixedly mounted and a portion spaced lengthwise from the fixedly mounted portion, means constraining the second mentioned portion of the strip from angular movement but permitting movement of said second portion in a line normal to the length of the strip, a thermal element fixed to said second portion of the strip in good heat conducting relation thereto, and controllable means for heating the thermal element, the switch having means for performing a temperature indicating or controlling function in response to said movement of the bimetallic strip.

2. A thermostatic switch as set forth in claim 1, in which the thermal element is of a material having high heat conductivity and of a form having large ratio of mass to surface area as compared with the ratio of mass to surface area of the bimetallic strip.

3. A thermostatic switch as set forth in claim 1, in which the thermal element is of a material having high heat conductivity and of a form having large ratio of mass to surface area as compared with the ratio of mass to surface area of the bimetallic strip, and means having a relatively large ratio of heat absorption capacity to heat dissipation factor arranged to be engaged by the thermal element in good heat conducting relation thereto for cooling the thermal element following the heating thereof.

4. A thermostatic switch as set forth in claim 1, in which the means constraining the second portion of the bimetallic strip to move in a line normal to the length of the strip is a component part of a means coacting with the bimetallic strip to cause snap-acting movement thereof in one direction when the strip is heated to a predetermined temperature and snap-acting movement in the opposite direction when the strip is cooled to a predetermined temperature.

5. A thermostatic switch comprising a strip of thermostatic material, means supporting one portion of the strip against both angular motion and motion in a direction normal to its length, means subjecting a second portion of the strip longitudinally spaced from the first mentioned portion to a reactive couple acting to restrain angular motion of the second portion by offering minimum restraint to said second portion in a direction normal to the length of the strip for the purpose of producing an effective thermostatic action at said second portion in the line of said direction in one way or the opposite depending on whether said second portion or that portion of the strip immediately adjacent to the first portion is heated, and a thermal element of high thermal conductivity and relatively large mass to surface area as compared with the thermostatic strip, said thermal element connected to said second portion of the strip in good heat conducting relation thereto, and means whereby the thermostatic response of the strip actuates the switch.

6. A thermostatic switch as set forth in claim 5, in which the second portion of the thermostatic strip is mainly responsive to change of temperature of the thermal element and thereby produces a thermostatic effect in said one direction and the other described portion of the strip is mainly responsive to the ambient temperature and thereby produces a secondary or compensating effect in the opposite direction to compensate for the effect of any variations in said ambient temperature.

7. A thermostatic switch having a switch action for indicating or controlling the temperature of a primary medium and for compensating for the effect of variations in temperature of an uncontrolled second medium, comprising a strip of thermostatic material, means restraining one portion of the strip against lateral and angular motion, means for applying a reactive couple to a second portion of the strip spaced lengthwise from the first mentioned portion to restrain angular motion of said second portion but permitting motion of said second portion in a line of action normal to the length of the strip, a thermal element of high thermal conductivity and relatively large mass to surface area as compared with that of the thermostatic strip, said thermal element fixed to said second portion of the thermostatic strip in good heat conducting relation thereto and being mainly responsive to the temperature of said primary medium, and means whereby thermostatic response of the strip actuates the switch.

8. A thermostatic switch as set forth in claim 7, in which the ambient temperature about said second portion of the strip is the uncontrolled medium, and in which the reactive couple acts to produce a thermal response in the thermostatic strip in said line of action in one direction upon a rise in temperature of said thermal element and a thermal response in said line of action in the opposite direction upon a rise in temperature of said uncontrolled medium.

9. A thermal timer adapted to provide a given time period within a limited time range, comprising a strip of thermostatic material mounted for movement of a portion thereof in opposite directions in response to change in temperature in the strip, a thermal element fixed to said moveable portion of the thermostatic strip in good heat conducting relation thereto, means for heating said thermal element, said time period being determined by the time necessary for said moveable portion of the strip to undergo a predetermined temperature change, said thermal element being of a material having high heat conductivity and of a form having large ratio of mass to surface area as compared with the ratio of mass to surface area of the thermostatic strip, whereby the thermal element has a ratio of heat capacity factor to heat dissipation factor such that its effective time constant (that time period necessary for the thermal element to reach about 63% of its equilibrium temperature) is of approximately the same magnitude as said given time period, and means actuated in response to said predetermined temperature change in the thermostatic strip to perform an indicating or controlling function at the termination of said given time period.

10. A thermal timer as set forth in claim 9, including means for effecting relatively quick cooling of the thermal element when the thermal timer has acted in an indicating or controlling function.

11. A thermal timer having a strip of thermostatic material of small ratio of mass to surface area, means supporting the thermostatic strip so that one end portion is fixed to a stationary support and the other end portion is constrained against angular motion but offering minimum restraint to motion in opposite directions in a line normal to the length of the strip for the purpose of applying a reactive couple to the strip and causing primary and secondary thermostatic actions in the strip in response to primary and secondary temperature mediums, said moveable end portion of the strip being moveable in said opposite directions by thermostatic action in response to difference in temperature between its said end portions, and a thermal element characterized by a large thermal time constant provided by a structure having a large ratio of mass to surface area fixed to said moveable end portion of the thermostatic strip in good heat conducting relation thereto, whereby said primary thermostatic action is effected by the medium of said heat conduction from the thermal element and said secondary thermostatic action by the medium of ambient temperature.

12. A thermal timer having, in combination, electric heating means, and means for controlling flow of electric current through said heating means in a given time period comprising a strip of thermostatic material of small ratio of mass to surface area, the strip having a portion fixedly mounted and a portion spaced lengthwise from the fixedly mounted portion, means constraining the second mentioned portion of the strip from angular movement but permitting movement of said second portion in a line normal to the length of the strip, and a thermal element heated by said heating means, said heating element being fixed to said second portion of the strip in good heat conduction relation thereto, said thermal element having a large ratio of heat absorption capacity factor to heat dissipation factor whereby to provide a relatively large thermal time constant, the thermostatic strip being primarily responsive to direct heat transfer from said thermal element and having a secondary response to changes in ambient temperature, said large thermal time constant serving to reduce the effect of voltage changes on the time period.

13. A thermal timer having, in combination, a strip of thermostatic material having a portion fixedly mounted and a second portion spaced lengthwise from the first mentioned portion, means constraining the second mentioned portion of the strip from angular movement but permitting movement of said second portion in a line normal to the length of the strip, a thermal element comprising a bar of metal having high heat conductivity and a large ratio of heat capacity factor to heat dissipation factor, said bar fixedly attached to said second mentioned portion of the strip in good heat conduction relation thereto, said bar having a heat transfer surface substantially parallel with the thermostatic strip, cooling means having a cooling surface arranged to be engaged by said heat transfer surface of the thermal element in response to said movement of the thermostatic strip, controllable means for heating the thermal element, heat being transferred from said thermal element through said second portion of the strip, said strip being responsive to said heat transfer to move said heat transfer surface of the bar into contact with said cooling surface, whereby heating and cooling cycles are performed, and means for heating the thermal element controlled in response to said movement of the thermal element in a direction to make said cooling contact.

14. A thermal timer as set forth in claim 13, in which the thermal element bar is disposed at one side of the thermostatic strip with its said heat transfer surface spaced from said side of the strip, and in which the cooling means comprises a bar of metal having high heat conductivity arranged intermediate the thermostatic strip and said heat transfer surface so that its cooling surface will be engaged by said heat transfer surface as described.

15. A thermal timer as set forth in claim 13, in which the means for constraining against angular movement the second portion of the thermostatic strip includes a rigid member attached in fixed relation to said second portion of the strip, pivoted means coacting with said rigid member substantially in parallelogram relation to the thermostatic strip, means yieldingly urging the described parallelogram parts in a direction to maintain said heat transfer surface in contact with said cooling surface and permitting movement of the thermostatic strip in a direction to separate said surfaces in response to temperature change in said strip and in opposition to said yielding means.

16. A thermal timer adapted to provide a given time period having, in combination, a bimetallic strip having a portion fixedly mounted and a second portion spaced lengthwise from the first mentioned portion, means constraining the second mentioned portion of the strip against angular motion but offering minimum restraint to motion in a line normal to the length of the strip, a thermal element fixed to said second portion of the strip in good heat conducting relation thereto, said thermal element being of a material having high heat conductivity and of a form having large ratio of heat absorption capacity factor to heat dissipation factor, and means for heating said thermal element, said timing period being determined by the time required for the thermal element to undergo a predetermined temperature rise.

17. A thermal timer as set forth in claim 16, including means for quick cooling of the thermal element at the end of the timing period by contact with a cooling surface.

18. A thermal timer as set forth in claim 16, in which the means for constraining the second portion of the thermostatic strip against angular motion is part of a parallelogram structure in which the thermostatic strip is one side of the parallelogram and the opposite side comprises a member having point bearing support at its opposite ends to provide substantially frictionless support for movement of the parts in said parallelogram movement.

19. A thermal timer adapted to provide a given time period, having a strip of thermostatic material fixedly supported at one end portion on a stationary member, a thermal element, a motion-translating member, means clamping the opposite end portion of the thermostatic strip between said thermal element and said motion-translating member so that said parts are in fixed relation one with respect to the other, said thermal element having a large ratio of heat capacity factor to heat dissipation factor, means for heating said thermal element, said time period being determined by the time required for the thermal element to undergo a predetermined temperature rise, the thermostatic strip being primarily responsive to heat transfer by conduction from said thermal element and having a secondary compensating action in response to ambient temperature, means controlling said heating means in response to movement of the thermostatic strip, and means acting through said motion-translating member to impose a force in opposition to that motion of the thermostatic strip which is effected in response to heating of said strip from said primary source.

20. A thermal timer as set forth in claim 19, including means for effecting relatively quick cooling of the thermal element at the termination of said time period.

21. A thermal timer as set forth in claim 19, including a cooling element arranged to effect relatively quick cooling of the thermal element by movement of the latter into contact with said cooling element.

22. A thermal timer as set forth in claim 19, including releasable latch mechanism coacting with said motion-translating member to retain it in a stationary position against the force of the last mentioned means.

23. A thermal timer having, in combination, a bimetallic strip having a portion fixedly secured to a stationary support and having another portion spaced lengthwise from the first mentioned portion, means constraining the second mentioned portion of the strip against angular motion but offering minimum restraint to motion in a line normal to the length of the strip for the purpose of applying a reactive couple to the strip and causing primary and secondary thermostatic actions in the strip in response to primary and secondary temperature mediums, a thermal element fixed to said second portion of the thermostatic strip in good heat conducting relation thereto, means for heating said thermal element, a circuit for said heating means including a switch arranged for closing and opening the heater circuit in response to movement of said second portion of the strip in opposite directions in said line, means for latching the parts in the circuit open position, means biasing the strip toward circuit closing position and for moving the strip to said circuit closing position upon release of said latching means, the thermostatic strip being responsive to said primary temperature medium by heat conduction directly from said thermal element for movement in a direction to open said circuit and responsive to the ambient temperature in a compensating action, the timing period being determined by the time required for the thermal element to undergo a predetermined temperature rise.

24. A thermal timer as set forth in claim 23, including control mechanism coacting with the latching means operable to release the latching means and automatically causing the latching means to latch the parts in the circuit open position upon termination of the timing period.

25. A thermal timer as set forth in claim 9, including means for quick cooling the thermal element at the termination of the time period.

LUDVIK J. KOCI.

REFERENCES CITED

The following references are of record in the file of this patent:

UNITED STATES PATENTS

| Number | Name | Date |
| --- | --- | --- |
| 1,514,816 | Anderson | Nov. 11, 1924 |
| 1,703,803 | Widstrom | Feb. 26, 1929 |
| 1,797,886 | Thomas | Mar. 24, 1931 |
| 2,208,760 | Hartig | July 23, 1940 |
| 2,263,103 | Rathbun | Nov. 18, 1941 |